B. GIFFORD.
Feed Trough.
No. 61,189. Patented Jan. 15, 1867.
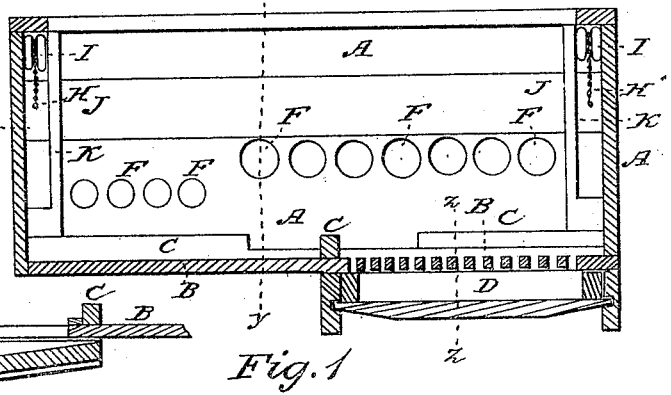
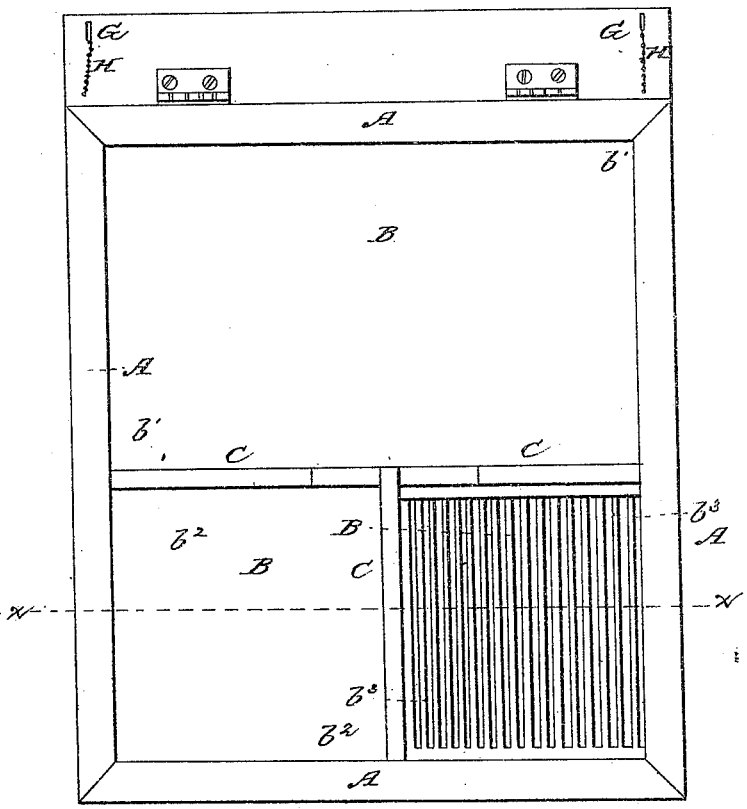
Witnesses:
F. A. Jackson
J. E. Service
Inventor:
Burton Gifford
Per Munn & Co
Attorneys

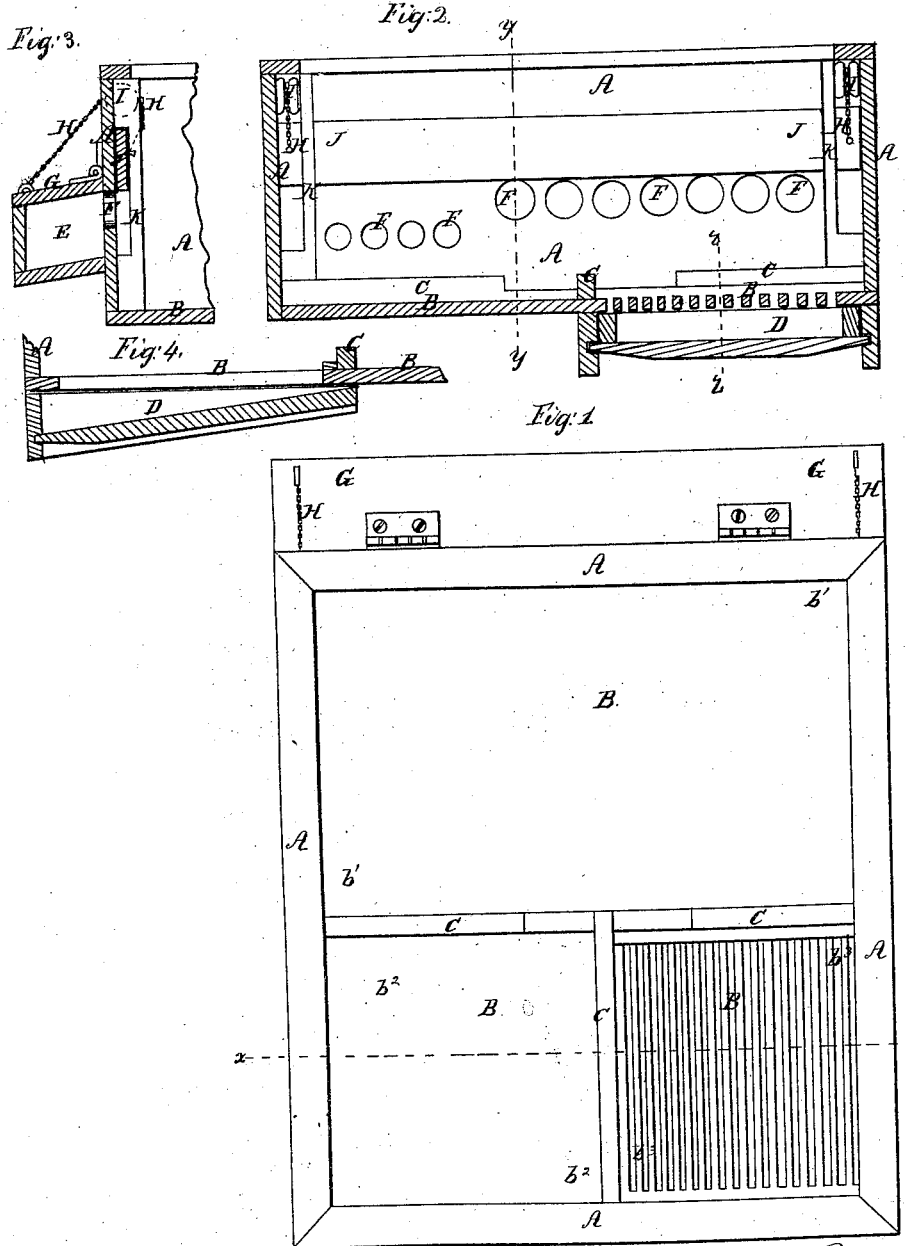

United States Patent Office.

BURTON GIFFORD, OF PEDEE, IOWA.

*Letters Patent No. 61,189, dated January 15, 1867.*

---

IMPROVEMENT IN HOG-PENS.

---

*The Schedule referred to in these Letters Patent and making part of the same.*

---

TO ALL WHOM IT MAY CONCERN:

Be it known that I, BURTON GIFFORD, of Pedee, in the county of Cedar, and State of Iowa, have invented a new and improved Hog-Pen; and I do hereby declare that the following is a full, clear, and exact description thereof, which will enable others skilled in the art to make and use the same, reference being had to the accompanying drawings, forming part of this specification, in which—

Figure 1 is a top or plan view of my improved hog-pen.

Figure 2 is a vertical cross-section of the same, taken through the line $x\ x$, fig. 1.

Figure 3 is a detail sectional view of the same, taken through the line $y\ y$, fig. 2.

Figure 4 is a detail sectional view of the same, taken through the line $z\ z$, fig. 2.

Similar letters of reference indicate like parts.

My invention has for its object to furnish an improved hog-pen, so constructed as to prevent the animals from wasting their food, and so as to promote their healthiness and cleanliness; and it consists in attaching the feeding-trough to the outside of the pen; in the combination of a hinged cover, chains, or cords, and a sliding-board, with the trough and perforated side of the pen; in forming a portion of the bottom or floor of the pen of slats, and in the combination of a movable box with said slatted bottom or floor, the whole being constructed and arranged as hereinafter more fully described.

A are the sides, and B is the floor of the pen. The floor B is divided into three compartments, $b^1$, $b^2$, and $b^3$, by the low partitions C. The compartment $b^1$, in which the hogs stand while eating, and in which they walk about, is made much the largest, as shown in fig. 1. The compartment $b^2$ is designed to receive their bedding, and the compartment $b^3$ their filth. The bottom of the compartment $b^3$ is slotted or formed of slats, as shown in figs. 1, 2, and 4, so that the filth may drop through it into the box D, placed beneath the slotted part of the floor B to receive said filth. The box D may be made in the form of a drawer, sliding in and out in grooves, as shown in fig. 2, or it may be made removable in any other convenient manner, according to the situation of the pen. E is the feeding-trough, which is attached to the forward side of the pen, just above the plane of the floor, as shown in fig. 4. F are openings, formed through the side of the pen, and leading into the trough E, through which the animals take their food. Some of these openings are made smaller than the others, so that the larger and stronger animals may not be able to eat the food of the smaller and weaker ones. G is the cover of the trough, which is hinged to the inner edge of said trough, or to the side of the pen. H are chains or cords, the ends of which are attached to the hinged cover G, which pass thence over friction-pulleys I, pivoted near the upper edge of the pen, and the other ends of which are attached to the board J, which slides up and down along the inner side of the front side of the pen, as shown in figs. 2 and 3, and is kept in proper position by guide-slats K attached to said side. The chains or cords H are made of such a length that when the cover G is raised to put in the food the board J will be lowered so as to cover the openings F, and keep the hogs away from the trough until the food has been properly placed therein; and when the cover G is shut down the board J will be raised, uncovering the openings F, and giving the hogs access to their food.

What I claim as new, and desire to secure by Letters Patent, is—

1. Attaching the trough to the outside of the pen, with graduated openings leading into it from the inside of said pen, substantially as herein shown and described.

2. The combination of the hinged cover G, chains or cords H, and sliding-board J, with the trough E, and with the perforated side of the pen, substantially as herein shown and described.

3. Forming a portion of the bottom or floor B of the pen of slats, or with slots, substantially as herein shown and described, and for the purpose set forth.

4. The combination of a removable box D with the slotted portion of the floor B, substantially as herein shown and described, and for the purpose set forth.

BURTON GIFFORD.

Witnesses:
WM. R. KELLY,
ASA GREGG.